Jan. 23, 1934.     G. H. SELF     1,944,829
BEAN HARVESTER
Filed Aug. 14, 1928     2 Sheets-Sheet 1
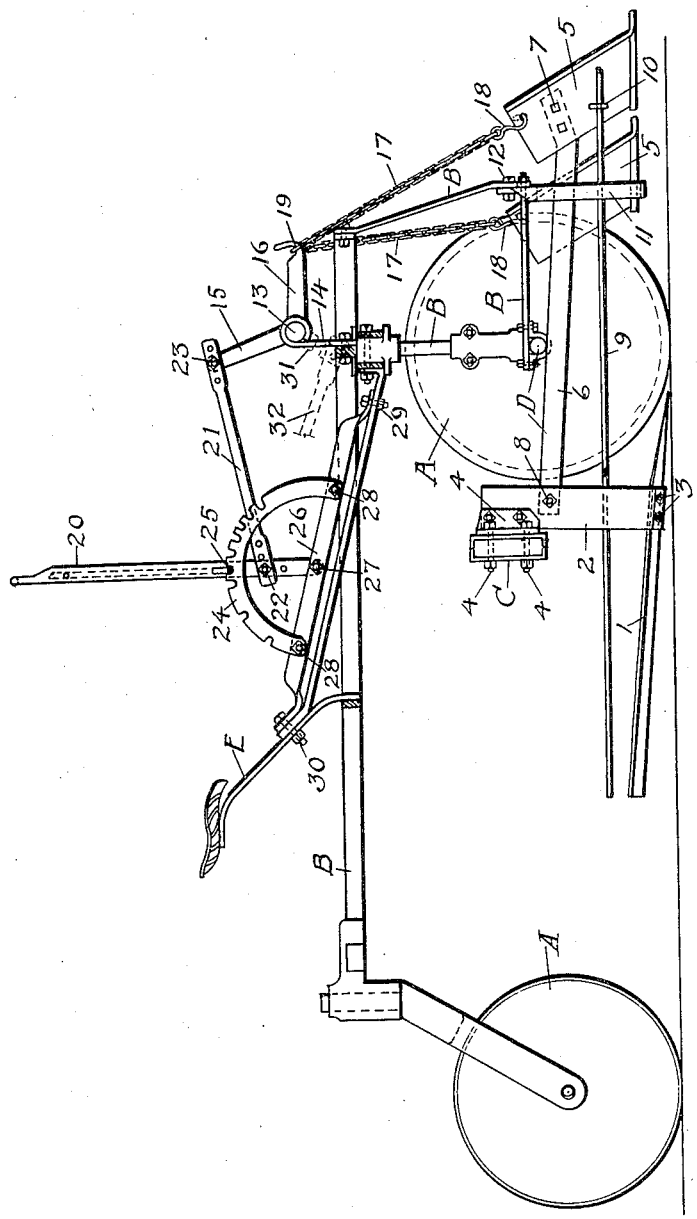
INVENTOR
Grafton H. Self Jan. 23, 1934.  G. H. SELF  1,944,829
BEAN HARVESTER
Filed Aug. 14, 1928   2 Sheets-Sheet 2
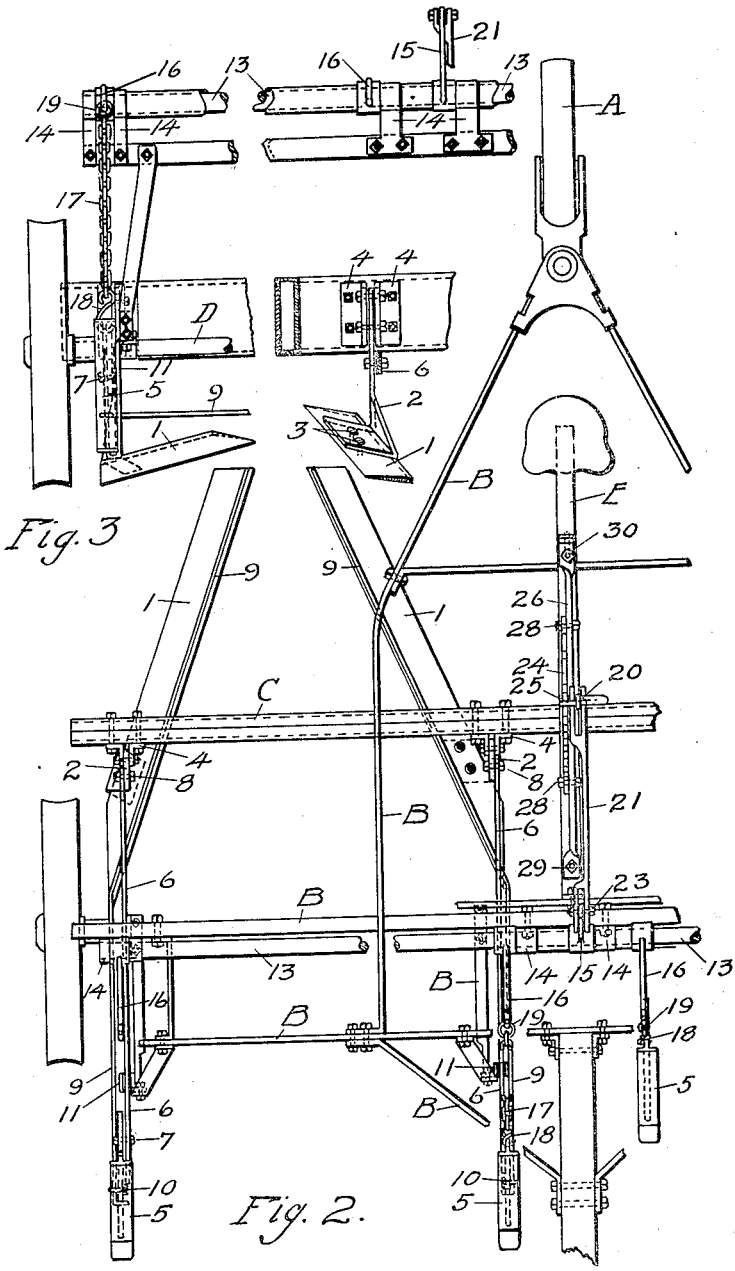
INVENTOR.
Grafton H. Self.

Patented Jan. 23, 1934

1,944,829

UNITED STATES PATENT OFFICE 1,944,829

BEAN HARVESTER

Grafton H. Self, Twin Falls, Idaho, assignor of one-half to Andrew J. Bockwitz, Twin Falls, Idaho Application August 14, 1928. Serial No. 299,470

4 Claims. (Cl. 56—192)

My invention relates to improvements in bean harvester machines and the like, comprising attachments made to operate in combination with the different makes of bean and beet cultivators and the like, having operable tool bars with means for raising and lowering said tool bars, including machines having adjusting members with means for tilting or securing said tool bar in selective positions with reference to the frame.

My improvement or attachment comprises cutting members attached to the lower ends of suitable supports, said supports attached by suitable means to the operable tool bars of cultivators and the like, also comprising members or means for separating and guiding of vines or plants, and adjustable means for attaching and raising and lowering of the said separating members, and means for attaching the operating means to the frame of the cultivator, for the independent operation of the plant separating member, also comprising means for engaging the plant separating means with that of the lever of the cultivator not shown, used for raising and lowering of the tool bar, thus permitting the raising and lowering of the plant separating member and the cutting member in unison if so desired.

I am aware of there being bean harvesters on the market, having cutting members that operate in combination with a crank beam or axle by which the operator raises and lowers his own body in conjunction with the cutting members. When the cutting member supports project so far below the cutting members, and do not permit of fine and easy adjustment for the proper angle of the cutting members, it will cause them to drag and require more power to operate.

With my attachment applied to the operable tool bar of a cultivator, it permits of finer adjustment and requires less power to operate, so that four rows are operable with the same power that the present two row harvester requires.

A further object of my invention is the ease in applying and removing my attachment to a beet, bean cultivator or the like, thus speeding up the work with less labor and power to operate.

A still further object of my invention is the use of one machine for more than one distinct operation, thus creating greater economy in operation and purchasing power for the farmer.

The invention will be more fully described and set forth in appended claims.

In the accompanying drawings Fig. 1 is a portion of the side view of a bean or beet cultivator, with a side view of my attachment thereto; Fig. 2 is a portion of the top view of a cultivator sufficient for showing the cutting members and plant separating members and their attachments thereto; Fig. 3 is a view showing method of attaching the cutting members to the uprights, and the uprights to the tool bar of the cultivator, also showing attachment of the plant separating means.

Similar characters of reference are used to denote corresponding parts in accompanying drawings and the following description. Numerals are used to designate the parts of my improvement and letters the parts of the machine to which my improvements are attached.

In general bean and beet cultivators and the like comprise a machine as in Fig. 1. A wheels for supporting and moving said machines; B the frames or supports of the machine; C the tool bar of the cultivator machine to which all of its tools are attached may consist of one or more cross bars and be of such construction that the tool bar can be raised and lowered by levers when operator is seated at E. D the axle is not of crank construction and in no way contributes to the operation of the tool bar as the present construction of bean harvesters now on the market do. 1 represents the cutting members attached to the upper side of upright support 2, by means 3, as in Fig. 1, or to the under side of support 2 as in Fig. 3, the upper end of support 2 being attached to tool bar C, by means 4, plant separating member 5 being connected with a bar 6 by means 7 with the opposite end of bar 6 pivotally connected with upright 2 at 8, it being necessary for one of the ends of bar 6 to be pivotally connected to permit of raising or lowering of either the cutting member 1 or plant separating member 5. 9 is a bar for guiding the plants or vines attached to plant separating member 5 at 10, 11 is a guide and support for bar 6, attached to B at 12, a rocker shaft 13 operating in support 14 having an upper arm extension 15, and an outward extension arm 16 connected by flexible adjusting means 17 at 19, and with plant separating member 5 at 18, hand operating lever 20 connecting with rod 21 at 22, opposite end of rod 21 connecting with arm 15 at 23, quadrant 24 comprising means for securing lever 20 as at 25, and means for pivotally connecting lower end of lever 20 with bracket 26 at 27, quadrant 24 being secured to bracket 26 at 28, bracket 26 being secured to frame brace at 29 and brace and seat support at 30, rocker shaft having a lower arm 31 for connecting with independent lever 20 and 21 as shown by 32, but principally for connecting with the main lever operating the tool bars, when both the cutting members 1 and the plant separating members 5 are desired to be raised and lowered in unison.

Having described my invention, what I claim by Letters Patent is:—

1. A bean harvester, composed of a cultivator or the like that has supporting wheels for its frames and tool bars, said tool bars being equipped with one master hand lever and means for raising, lowering, and securing same in selective positions, in combination with vertical supports and rearwardly converging cutting members, each upper end of said supports being attached to the tool bars, and the lower ends to each of the cutting members at a point intermediate their ends, vine-separating members with windrowing rods, attached to bars projecting through guiding yokes to the rear, and means for pivotally connecting the ends of said bars to the supports.

2. A bean harvester, composed of a cultivator or the like that has supporting wheels for its frames and tool bars, said tool bars being equipped with one master hand lever and means for raising, lowering, and securing same in selective positions, in combination with vertical supports and rearwardly converging cutting members, each upper end of said supports being attached to the tool bars, and the lower ends to each of the cutting members at a point intermediate their ends, vine-separating members with windrowing rods, attached to bars projecting through guiding yokes to the rear, and means for pivotally connecting the ends of said bars to the supports, a movable shaft having extension arms, and means for attaching said shaft to the front end of said cultivator, means for adjustably attaching certain of said arms to the vine-separating members.

3. A bean harvester, composed of a cultivator or the like that has supporting wheels for its frames and tool bars, said tool bars being equipped with one master hand lever and means for raising, lowering, and securing same in selective positions, in combination with vertical supports and rearwardly converging cutting members, each upper end of said supports being attached to the tool bars, and lower ends to each of the cutting members at a point intermediate their ends, vine-separating members with windrowing rods, attached to bars projecting through guiding yokes to the rear, and means for pivotally connecting the ends of said bars to the supports, a movable shaft having extension arms, and means for attaching said shaft to the front end of said cultivator, means for adjustably attaching certain of said arms to the vine-separating members, a quadrant and hand lever and means for securing said lever in selective positions, means for attaching the quadrant to said cultivator, a rod and pivotal means for attaching the hand lever to the extension arm on the movable shaft, for raising the vine-separating members independent of the cutting members.

4. A bean harvester, composed of a cultivator or the like that has supporting wheels for its frames and tool bars, said tool bars being equipped with one master hand lever and means for raising, lowering, and securing same in selective positions, in combination with vertical supports and rearwardly converging cutting members, each upper end of said supports being attached to the tool bars, and lower ends to each of the cutting members at a point intermediate their ends, means for attaching the upper ends of the supports to the tool bars, and means for attaching the lower ends of the supports to the cutting members for the purpose of raising, lowering, and operating the cutting members with the tool bars by the use of the master hand lever, vine-separating members with windrowing rods attached to bars projecting through guiding yokes to the rear, and means for pivotally connecting the ends of said bars to the supports, a movable shaft having extension arms, and means for attaching said shaft to the front end of said cultivator, means for adjustably attaching certain of said arms to the vine-separating members, a rod and pivotal means for connecting certain said arm of said shaft to the hand lever of said cultivator that operates the tool bars, for raising and lowering of the vine-separating members in unison with the cutting members.

GRAFTON H. SELF.